Oct. 3, 1950            F. J. GIROUX            2,524,223
ARC OXYGEN CUTTING ACCESSORY
Filed Jan. 21, 1947
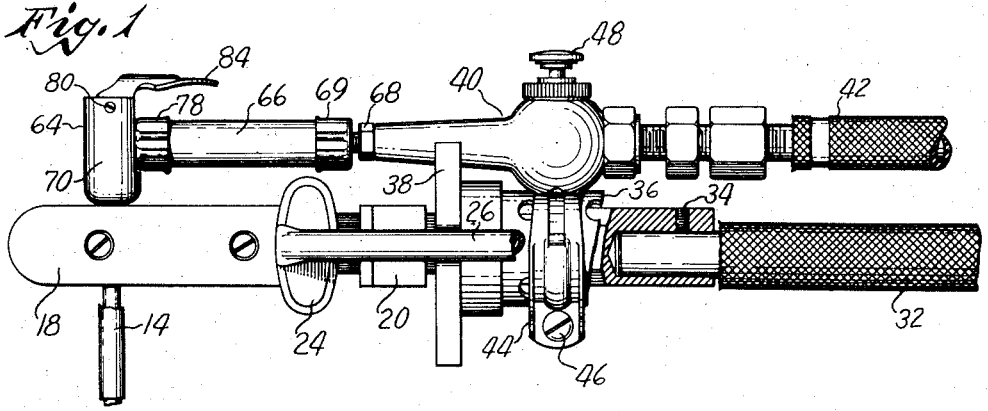
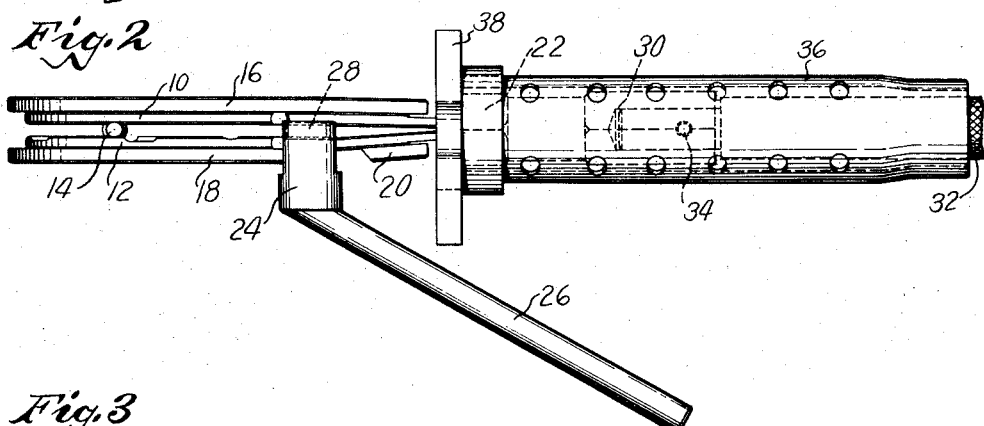
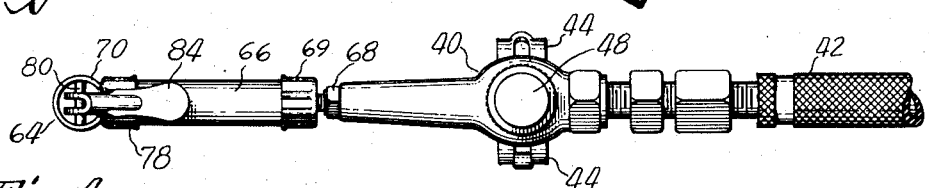
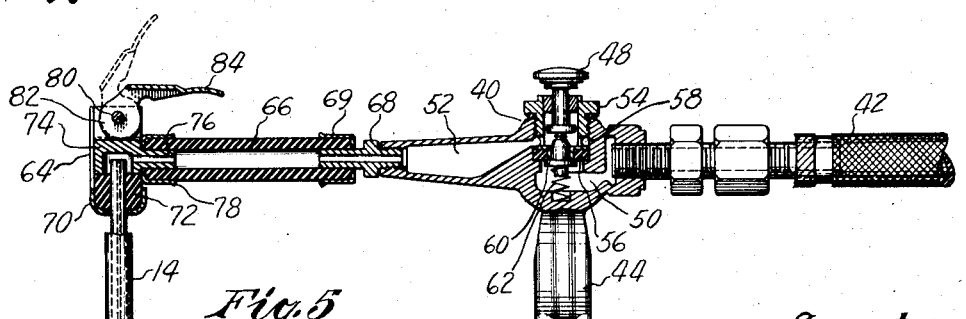
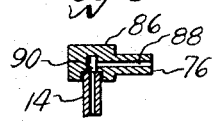
Inventor
FRED J. GIROUX
by S. Jay Teller
Attorney Patented Oct. 3, 1950

2,524,223

UNITED STATES PATENT OFFICE 2,524,223

ARC OXYGEN CUTTING ACCESSORY

Fred J. Giroux, Hartford, Conn.

Application January 21, 1947, Serial No. 723,356

4 Claims. (Cl. 219—15)

In the art of cutting metals by means of an electric arc it is known practice to use a hollow or apertured electrode and to supply oxygen to the electrode so that it is released within the arc formed between the electrode and the metal to be cut. The oxygen thus supplied and released increases the temperature at the arc and aids in the oxidization of the metal, thus greatly facilitating the cutting operation.

The principal object of the present invention is to provide an accessory which can be used with an apparatus primarily adapted and intended for arc welding and serving when so used to supply oxygen to a hollow or apertured electrode so that the said apparatus may be used for metal cutting by the arc oxygen method.

A more specific object of the invention is to provide an accessory of the type referred to having various advantageous features of construction and arrangement.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing,

Fig. 1 is a side view of an electrode holder together with an accessory incorporating the present invention, a portion of the holder being shown in section.

Fig. 2 is a plan view of the electrode holder without the accessory.

Fig. 3 is a plan view of the accessory without the electrode holder.

Fig. 4 is a longitudinal sectional view through the accessory.

Fig. 5 is a view showing an alternative construction for one part of the adapter head.

The electrode holder shown in Figs. 1 and 2 is primarily adapted and intended for use in arc welding and it does not of itself constitute any part of the present invention, but the said holder is shown and will be described in order that the accessory to which the invention primarily relates may be more clearly understood. The holder shown has been selected merely by way of example and it will be understood that the accessory, with suitable modifications as to detail when necessary, may be used with other electrode holders.

The electrode holder as shown comprises two electrode gripping jaws 10 and 12 which are adapted to hold an electrode 14. The jaws may be grooved in order to more firmly hold the electrode, and grooves may be provided at various angles so that the electrode may be held in various angular positions. Preferably, the jaws 10 and 12 carry insulating plates 16, 18 and 20 which are somewhat larger than the jaws. The inner end portions of the jaws 10 and 12 project into a recess in a metallic retaining member 22 and are firmly secured therein by any suitable means. The resiliency of the jaws is such that they are normally biased toward each other to grip the electrode.

The jaws 10 and 12 may be slightly separated in order to release the electrode, this being effected by means of a member 24 preferably formed of insulating material and having an arm 26. A portion of the member 24, as indicated at 28, extends between the jaws and is sufficiently thin to permit the jaws to move toward each other to grip the electrode. However, when the arm 26 is moved inward, the portion 28 which projects between the jaws is tilted and it forces the jaws apart sufficiently to release the electrode.

Formed integrally with the retaining member 22 is a socket 30 for receiving the end of an electrical conductor or cable 32. The cable may be secured in place in the socket by means of a set screw 34. Surrounding the retaining member 22 and the socket 30 and the end portion of the cable 32 is a tubular handle 36 formed of insulating material. This is suitably secured in place. There is also preferably provided a plate 38 of insulating material which is generally rectangular in form and which is secured in place immediately adjacent the end of the handle 36.

In normal use for welding purposes the electrode holder is manually held by the handle 36 and current is supplied through the cable 32 to the jaws 10 and 12 and thence to the electrode 14. An electric arc is formed between the end of the electrode and the metal to be welded.

It is well recognized in the art of metal cutting by means of an electric arc that more effective results can be attained by supplying oxygen to the interior of the arc. When cutting, rather than welding, is to be effected, the electrode 14 has a small longitudinal hole therethrough for receiving oxygen and for conducting it to the arc. The electrode is preferably coated in accordance with usual practice, and the coating is removed at the upper portion of the electrode to permit electrical contact with the jaws of the holder. The present invention relates particularly to an accessory which can be used in combination with an electrode holder such as that already described in detail and which serves to supply oxygen to the aperture in the electrode, the said accessory being adapted for the convenient control of the flow of oxygen to the electrode and being adapted for ready attachment to the electrode holder.

The accessory includes a manually operable valve generally indicated at 40, this being readily connectible with a hose 42 leading from an oxygen tank or other source of oxygen supply. The valve 40 is detachably connectible with the electrode holder and preferably with the handle 36 thereof. As shown, the valve has two arcuate arms 44, 44 which are of such size and shape as to be adapted to embrace the handle 36. A screw 46 extends through apertures in the lower ends of the arms and by means of the screw the arms can be drawn together so as to firmly engage the handle and thus hold the valve securely in place. The valve 40 is normally closed and can readily be opened manually. The valve 40 may be widely varied as to its details, but the valve as shown is openable by means of a push button 48. If necessary the insulating plate 38 may be notched to receive a projecting portion of the valve.

The main body of the valve 40 is formed with a vertical aperture which communicates at the bottom with a chamber 50 connected with the inlet side of the valve and the hose 42, and which also communicates with a chamber 52 at the outlet side of the valve. A plug 54 extends into the said aperture and has threaded engagement with the upper portion thereof. The plug carries a washer 56 of suitable packing material which is forced by the plug against a seat at the top of the chamber 50. An interior opening is formed in the plug 54 and in the washer 56 and this chamber communicates by means of radial holes with an annular groove 58 which registers with an opening extending to the chamber 52. The valve is normally closed by means of a closure 60 which engages the washer 56 to close the opening therethrough, the said closure 60 being pressed upward by a spring 62. The before-mentioned button 48 is carried by a central stem which extends through the plug 54 with its inner end engaging the closure 60. It will be seen that the valve is normally closed by the closure 60 but can be opened by pressing on the button 48, thus moving the closure 60 downward in opposition to the spring 62. This provides an opening from the chamber 50 to the chamber 52.

Associated with the valve 40 is an adapter head 64 which is adapted to engage the upper end of the electrode 14 and to supply oxygen to the aperture therein. Preferably, the adapter head 64 is connected with outlet chamber 52 of the valve 40 by means of a flexible hose 66. As shown, the hose 66 is connected with the valve by means of a centrally apertured connector 68. A ferrule 69 surrounds the end of the hose.

The adapter head 64 may be of standard or conventional construction, and as shown, it comprises a casing 70 apertured to receive the upper end of the electrode 14. In the lower end of the casing 70 is a resilient body 72 formed of rubber or other suitable material, this body being also apertured to receive the upper end of the electrode. The casing 70 of the adapter head is longitudinally slotted at the right and downward from the top, and a member 74 is provided which fits the casing and which is provided with a stem 76 projecting through the slot and into the hose 66. The slot permits the member 74 to move longitudinally of the casing 70. The member 74 has a central opening therein and an aperture in the stem 76 provides communication between the hose 66 and the said opening. The end of the hose is surrounded by a ferrule 78 which abuts against the casing.

Extending transversely across the casing 70 near the top thereof is a pivot pin 80 on which is mounted an eccentric 82 having a finger piece 84. When the finger piece 84 is in its upper positon, as shown by dotted lines in Fig. 4, the resilient body 72 is in its normal condition and the hole therethrough is of such size as to permit the end of the electrode to be freely inserted. When the finger piece 84 is moved from the dotted line position to the full line position the eccentric 82 engages the upper surface of the member 74 thus forcing the said member 74 downward relatively to the casing and compressing the resilient body 72. As the said body 72 is compressed it is forced inward so as to firmly grip the electrode to form a gastight connection therewith.

With the adapter head constructed as shown in Fig. 4, care must be taken to avoid insertion of the electrode into the head to such an extent that the end of the electrode abuts against the top of the opening in the member 74. If the electrode were so inserted the supply of oxygen thereto would be cut off or substantially cut off. It may be preferable to provide a member 86, as shown in Fig. 5, as a substitute for the member 74. The member 86 has the top face of its central opening below the hole 88 extending through the stem 76, the said hole 88 being inclined upward, if necessary. A vertical hole 90, of smaller diameter than the exterior of the electrode 14, provides communication between the said central opening and the said hole 88. When the member 88 is provided the electrode 14 can be inserted until it abuts against the top face of the central opening in the member, and the hole 90 insures a supply of oxygen to the hole in the electrode.

In use the accessory is attached to the electrode holder in the manner described, the hose 42 being connected with a suitable source of oxygen supply. The valve 40 is normally closed, as already explained. With the finger piece 84 in its upper dotted line position, the adapter head 64 is positioned with the end of the electrode 14 extending into it. Then the finger piece is moved from the dotted line position to the full line position to form a gastight connection with the electrode. It will be seen that the flexible hose 66 permits the adapter head to be positioned to accommodate various positions of the electrode. The accessory provides a continuous connection between the source of oxygen supply and the electrode, and oxygen can be supplied to the electrode at any time by manually opening the valve 40.

The electrode holder when provided with the accessory as described is adapted for metal cutting by the arc oxygen method. By means of the handle 36, the combined apparatus is so moved that the end of the electrode 14 cuts the metal along any desired lines. Oxygen is supplied to the electrode and thence to the arc by opening the valve 40, and the stream of oxygen thus provided increases the heat of the arc and aids in the oxidization of the metal to cause more effective cutting. The force of the jet of oxygen assists in removing molten and oxidized metal out of the cut, thus further facilitating cutting, It will be understood that the electrode 14 is rapidly expendable and can be readily replaced as required. Thus, by means of the accessory, an electrode holder, originally intended for arc welding, can be readily adapted for arc oxygen cutting.

What I claim is:

1. An accessory for use with an electrode holder which includes clamping jaws for holding a transversely positioned longitudinally apertured expendable electrode, a conductor terminal electrically connected with the jaws and an insulating handle for bodily moving the said jaws and the electrode, the said accessory comprising in combination, a normally closed manually openable valve connectible with a source of oxygen supply, clamping means connected with the valve and adapted to embrace the insulating handle to releasably attach the former to the latter, and an adapter head connected with the valve to receive oxygen therefrom and including an apertured resilient body adapted to surround and fit the end portion of the hollow electrode which is adjacent the clamping jaws so as to supply oxygen to the aperture in the electrode.

2. An accessory for use with an electrode holder which includes clamping jaws for holding a transversely positioned longitudinally apertured expendable electrode, a conductor terminal electrically connected with the jaws and an insulating handle for bodily moving the said jaws and the electrode, the said accessory comprising in combination, a normally closed manually openable valve connectible with a source of oxygen supply, clamping means connected with the valve and adapted to embrace the insulating handle to releasably attach the former to the latter, a flexible hose connected with the valve to receive oxygen therefrom, and an adapter head connected with the hose to receive oxygen therefrom and including an apertured resilient body adapted to surround and fit the end portion of the hollow electrode which is adjacent the clamping jaws so as to supply oxygen to the aperture in said electrode.

3. An accessory for use with an electrode holder which includes clamping jaws for holding a transversely positioned longitudinally apertured expendable electrode, a conductor terminal electrically connected with the jaws and an insulating handle for bodily moving the said jaws and the electrode, the said accessory comprising in combination, a normally closed manually openable valve connectible with a source of oxygen supply, means for attaching the valve to the holder, and an adapter head including a member having a horizontal face for engagement by the upper end of the electrode above the clamping jaws and having an aperture extending to the said face which is of smaller diameter than the exterior of the electrode and is in communication with the valve to receive oxygen therefrom, the said adapter head also including an apertured resilient body immediately below the said member and adapted to surround and fit the upper end portion of the electrode.

4. An accessory for use with an electrode holder which includes clamping jaws for holding a transversely positioned longitudinally apertured expendable electrode, a conductor terminal electrically connected with the jaws and an insulating handle for bodily moving the said jaws and the electrode, the said accessory comprising in combination, a normally closed manually openable valve connectible with a source of oxygen supply, clamping means connected with the valve and adapted to embrace the insulating handle to releasably attach the former to the latter, a flexible hose connected with the valve to receive oxygen therefrom, and an adapter head connected with the hose to receive oxygen therefrom and including an apertured resilient body adapted to surround and fit the end portion of the hollow electrode which is adjacent the clamping jaws so as to supply oxygen to the aperture in said electrode and also including manually operable means for compressing the resilient body to force it into firm engagement with the electrode.

FRED J. GIROUX.

REFERENCES CITED

The following references are of record in the file of this patent:

UNITED STATES PATENTS

| Number | Name | Date |
| --- | --- | --- |
| 1,137,834 | Bowers | May 4, 1915 |
| 1,927,135 | Sammons | Sept. 19, 1933 |
| 2,416,278 | Austin et al. | Feb. 25, 1947 |
| 2,475,594 | Danhier | July 12, 1949 |
| 2,475,595 | Hunter | July 12, 1949 |